United States Patent [19]

Ziegler

[11] Patent Number: 4,733,257

[45] Date of Patent: Mar. 22, 1988

[54] ALIGNMENT METHOD AND ARRANGEMENT FOR USE WITH A VIEW CAMERA

[76] Inventor: William R. Ziegler, 417 Shirley Way, Menlo Park, Calif. 94025

[21] Appl. No.: 49,738

[22] Filed: May 13, 1987

[51] Int. Cl.⁴ .............................................. G03B 5/06
[52] U.S. Cl. ..................................... 354/189; 356/153
[58] Field of Search ............... 354/187, 188, 189, 191; 356/138, 153; 33/281, 286

[56] References Cited

U.S. PATENT DOCUMENTS 2,701,501  2/1955  Cuny ................................... 356/153
3,825,938  7/1974  Koch ................................ 354/189 X

OTHER PUBLICATIONS

Hasselblad, Linear Mirror Unit, (Instructions).

Primary Examiner—L. T. Hix
Assistant Examiner—Brian W. Brown
Attorney, Agent, or Firm—Flehr, Hohbach, Test, Albritton & Herbert

[57] ABSTRACT

A view camera which includes, among other components, a lens standard for containing a lensboard and lens and a film standard for receiving a film holder containing film is disclosed herein along with a reliable technique for aligning the lens and film standards such that the lens plane defined by the lens standard and the film in the film standard are in confronting, parallel relationship to one another. This is accomplished by optically utilizing a set of mirrors within the camera and indicia located on at least one of the mirrors. The latter are manipulated until the indicia takes on a specific form, as viewed from outside the camera, which form corresponds to the desired parallel relationship between the film and lens plane.

19 Claims, 8 Drawing Figures

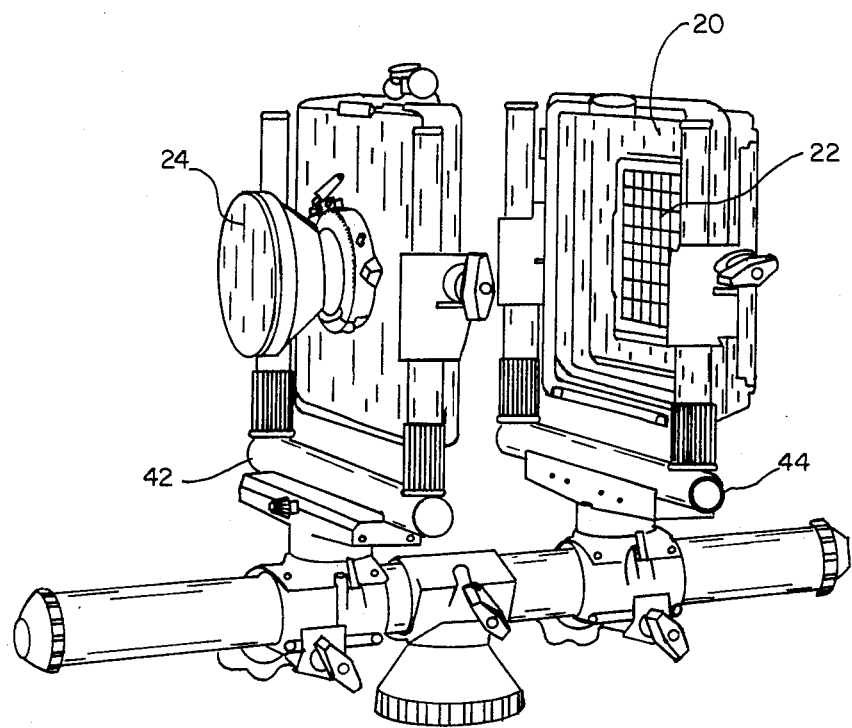
FIG. —3

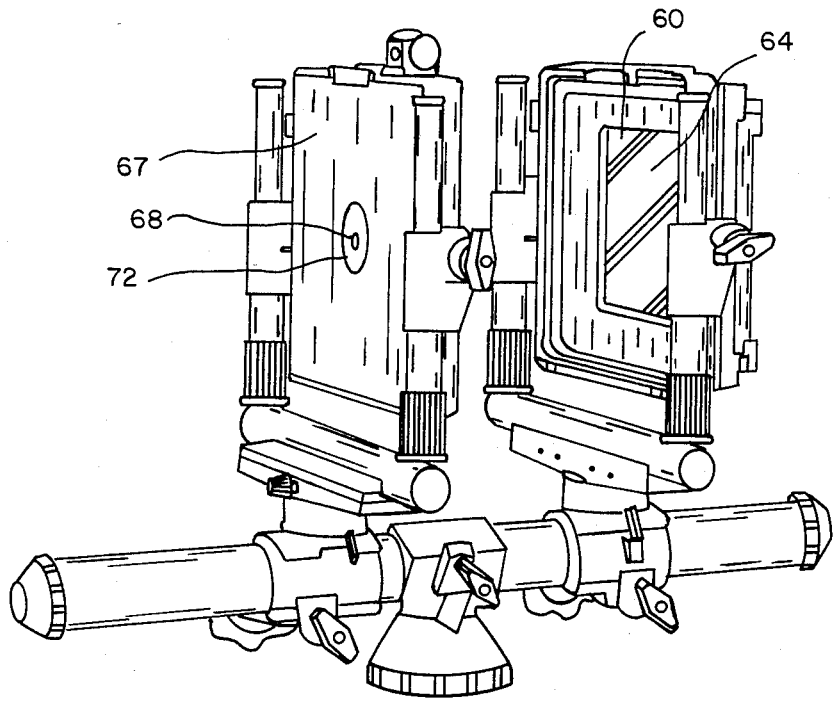
FIG.—4
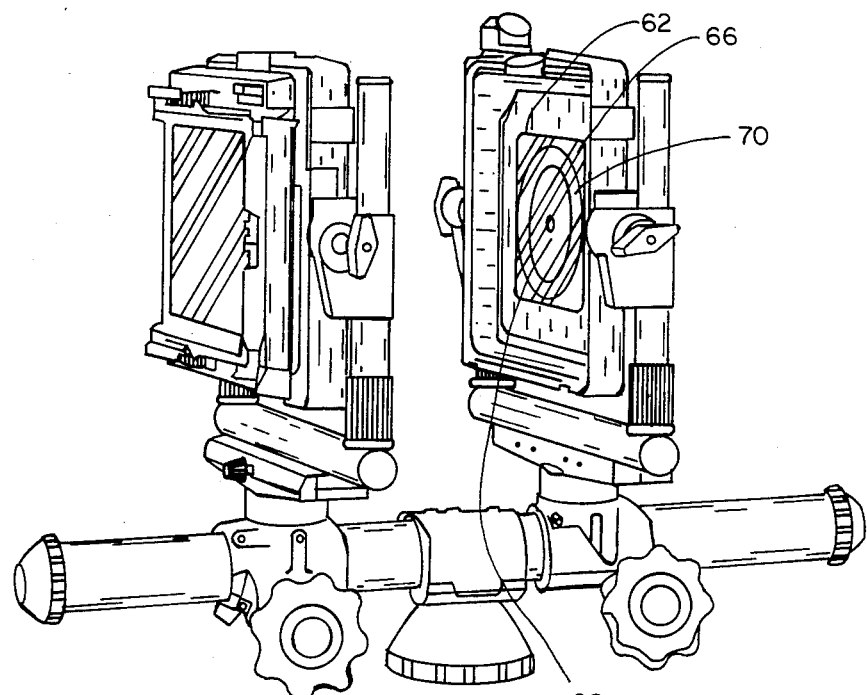
FIG.—5

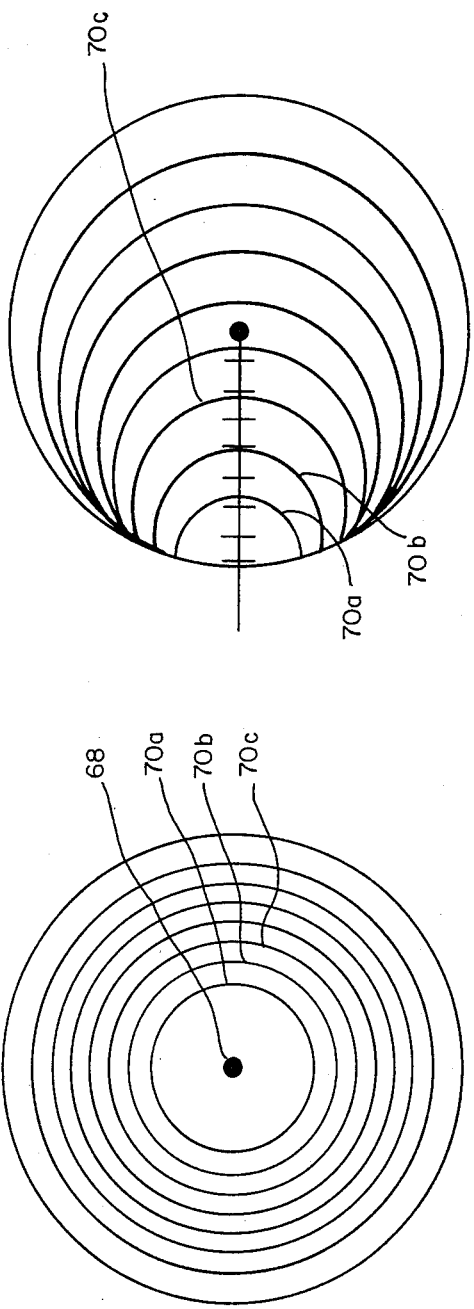
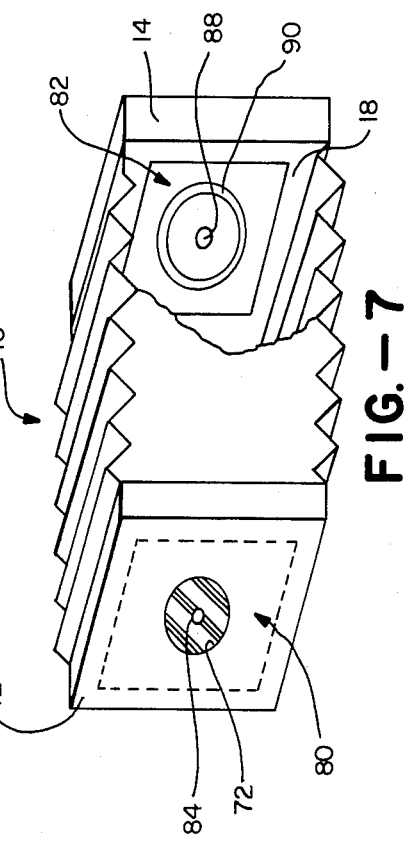

ALIGNMENT METHOD AND ARRANGEMENT FOR USE WITH A VIEW CAMERA

The present invention relates generally to view cameras and more particularly to a technique for insuring that its lens plane and film plane are parallel to one another.

View cameras are well-known in the photographic art. The typical camera of this type includes a lens standard, a film standard in spaced-apart confronting relationship with the lens standard, and a camera housing, typically an axially adjustable bellowed housing, connected with and extending between the lens and film standards. The lens standard serves to contain a lensboard which carries the camera's lens and which defines the camera's lens plane. The film standard which includes a ground-glass is configured to receive a film holder containing film which itself defines the camera's film plane. In addition to these components, the camera, actually the overall camera assembly, includes a mechanical arrangement of components on a horizontal support bar, including various knobs for the lens standard and film standard such that the standards can be adjustably moved with respect to one another to maintain a confronting, parallel relationship.

In order to operate the above-described view camera with maximum sharpness, it is necessary that the camera be "zeroed" before a picture is taken, that is, the lens and film standards are located at scales or indents provided by the manufacturer. This requires that the lens plane and the camera's film plane be perfectly parallel even if swings or tilts will be used. This latter relationship is provided by means of mechanical adjustments and mechanical measurements. To this end, both the lens standard and the film standard are adjustably supported for rotation about intersecting horizontal and vertical axes. Typically, the photographer will rely on the manufacturer's scales or indents to insure that the standards are indeed parallel with one another. If these settings are off, he may never realize it.

By assuming the lens and film standards are parallel the photographer also assumes that the lens plane and film plane will also be parallel. Applicant has found that this is not the case. Cameras are not perfectly made and, indeed, even cameras made by the same manufacturer may vary in tolerances from one camera to another. Thus, while the lens and film standards of two supposedly identical cameras may be placed in parallel relationship mechanically, the relationships between the lens and film planes of the two cameras may differ and, indeed, they may not be parallel. In fact, applicant has found that even after a particular view camera has been adjusted to provide the desired parallel relationship between its lens and film standards, the positional relationship between its lens and film planes may vary as the camera is moved from one location to another.

In view of the foregoing, it is an object of the present invention to provide a more accurate and reliable alignment technique to insure a parallel relationship between the lens and film planes of a view camera.

Another object of the present invention is to provide such an alignment technique which is also uncomplicated and economical to incorporate into existing, standard view cameras.

A more particular object of the present invention is to provide an alignment technique which actually acts directly on the lens and film planes of the camera to insure that they are parallel rather than merely on the lens and film standards.

Still another particular object of the present invention is to provide an alignment technique that does not require making any modifications to an existing camera but rather utilizes additional components which are compatible with the standard components of the camera.

Yet another particular object of the present invention is to provide an alignment technique that is capable of acting directly on the lens and film planes of the camera even if the camera housing cannot be removed from the rest of the camera.

As will be described hereinafter, the alignment technique disclosed herein utilizes a pair of mirror members, a first mirror member having a mirror body including its own mirrored surface and a second mirror member having a mirror body including its own mirrored surface. The first mirror member is configured to fit within the film standard in lieu of a film holder so that its mirrored surface faces the lens standard and coincides or substantially coincides with the camera's film plane. The second mirror member is configured to temporarily replace the camera's lens on its lensboard which is within its lens standard so that the second mirrored surface faces the film standard and first mirrored surface and coincides with the camera's lens plane. In addition, the second mirror member includes a view hole through its mirror body and mirrored surface so that the first mirrored surface in the film standard can be viewed therethrough from outside the lens standard. At the same time, certain specific indicia are provided on at least one of the mirrored surfaces such that, when the first mirrored surface is viewed through the view hole of the second mirrored surface from outside the lens standard, the indicia will take only one of many different forms if the two mirrored surfaces are parallel. In this way, as the indicia is viewed, the lens and film standards can be adjusted to cause the indicia to take on the one particular form, thereby insuring that the mirrored surfaces and therefore the lens and film planes are indeed parallel.

Note that the photographer does not concern himself with whether or not the lens and film standards are actually parallel. They may or may not be. What is important is that the indicia take on the one particular form that results from the mirrored surfaces and therefore the lens and film planes being parallel. In an actual working embodiment of the present invention, the indicia provided include a hole or dot and an outer concentric circle. When the lens and film planes are parallel, a back and forth reflection of the circle by the mirrors takes on the appearance of continuous, never-ending straight tube with the hole at its center. When the lens and film planes are not parallel, this tube bends to one side of its center. In a preferred embodiment of the present invention, the adjustment technique described immediately above is carried out with the camera housing removed. This allows the photographer to take advantage of the ambient light in order to view the indicia. There are however, some view cameras in which the housing cannot be removed. In this case, applicant has provided different ways to provide sufficient light within the camera housing so that the indicia therein can be seen. In accordance with one such way, a battery-powered light source is actually placed within the camera housing, temporarily. The other way relies on the ambient light which is allowed to enter the camera housing through the indicia which is itself formed from translucent or transparent portions of one of the mirror members.

The alignment technique described briefly immediately above will be discussed in more detail hereinafter in conjunction with the drawings wherein:

FIG. 3 is a side perspective view of the view camera of FIGS. 1 and 2, with its housing removed;

FIG. 4 is a perspective view of the camera illustrated in FIG. 3 but with its lens and lensboard removed and with the alignment arrangement of the present invention incorporated into the camera;

FIG. 5 is a view of the camera similar to FIG. 4 but from the opposite side of the camera;

FIGS. 6A and 6B diagrammatically illustrate certain operational features of the alignment arrangement of the present invention; and FIG. 7 is a diagrammatic illustration, in partially broken away perspective view of a modified alignment arrangement for use with a view camera having a camera housing that cannot be removed.

Figure 1:
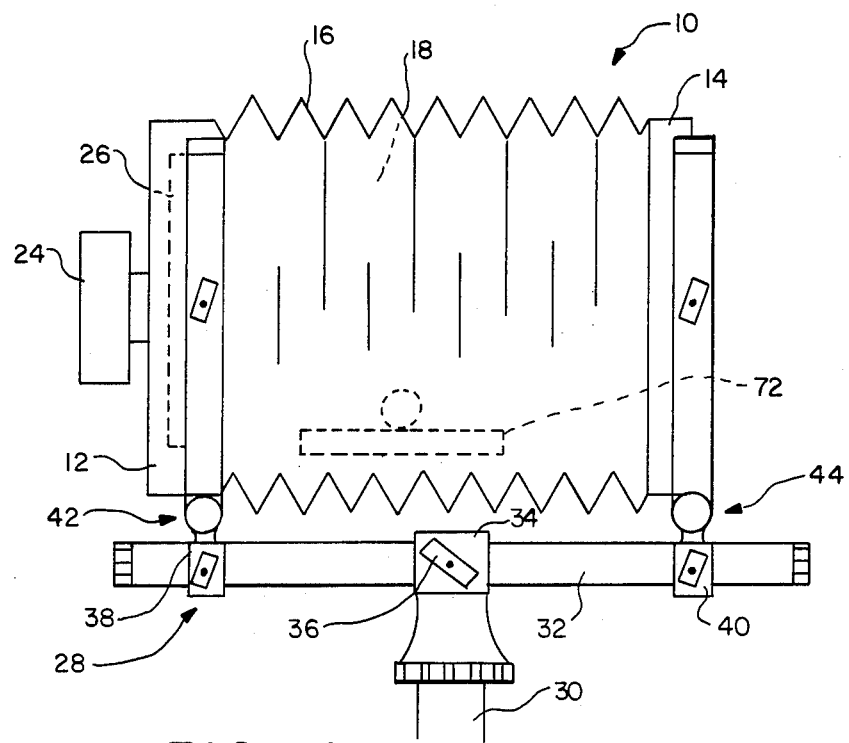
FIG. 1 is a side elevational view of a typical view camera which incorporates the alignment technique of the present invention.
Figure 2:
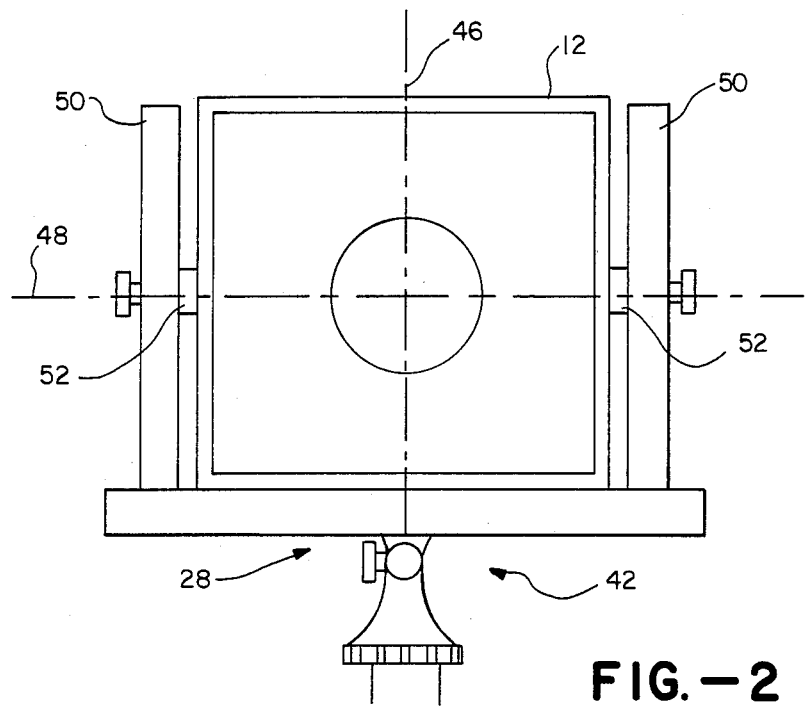
FIG. 2 is a front elevational view of the view camera of FIG. 1.

Turning now to the drawings, wherein like components are designated by like reference numerals throughout the various figures, attention is first directed to FIGS. 1-3. These figures illustrate a standard view camera of the type to which the present invention is directed. This camera which is generally indicated by the reference numeral 10 includes the lens standard 12, a film standard 14 in spaced-apart confronting relationship with the lens standard, and a bellowed camera housing 16 connected with and extending between the lens and film standards so as to define a closed camera chamber 18.

As best illustrated in FIG. 3, where the camera housing 16 has been removed, film standard 14 is shown including a station or area 20 for receiving a film holder containing film and a ground-glass 22 forming the back side of the film standard for viewing by the photographer. Still referring to FIG. 3, lens standard 12 is shown in combination with a lens 24 which is carried by a lensboard (see FIG. 1) contained within the lens standard. When a film holder (not shown) is placed within station 20 of film standard 14, the film defines a film plane which, as indicated previously, should be parallel with the lens plane of the camera which itself is defined by lensboard 26. Heretofore, the photographer has assumed that relationship by "zeroing" the camera, typically by using indents or scales. This camera is supported by an arrangement which forms part of the overall camera assembly and which is generally indicated by the reference numeral 28 in FIGS. 1 and 2.

Still referring to FIGS. 1-3, the mechanical support arrangement 28 for the standards includes a main support stand 30, only the top end of which is shown. A main horizontal support bar or monorail 32 is mounted for adjustable horizontal movement relative to and on top of stand 30 within adjustment sleeve or clamp 34 and cooperating adjustment knob 36. Two similar adjustment sleeves 38 and 40 with cooperating adjustment knobs are slidably mounted on main bar 32, typically on opposite sides of clamp 34 although it does not have to be. The adjustment sleeves 38 and 40 respectively support lens standard 12 and film standard 14. In this way, the entire main bar 32 is slidably adjustable horizontally relative to the support stand 30 while each of the standards 12 and 14 are slidably adjustable horizontally relative to the base stand and to one another.

As best illustrated in FIG. 3 in conjunction with FIG. 2, the lens and film standards 12 and 14 are supported to their respective adjustment sleeves 38 and 40 through crossbar mechanisms 42 and 44, respectively. Each of these mechanisms supports its standard for rotation about a vertical axis extending through the center of the standard. The vertical axis 46 associated with standard 12 is shown in FIG. 2. A similar axis extends through standard 14. At the same time, each of the standards is adjustably supported for rotation about a horizontal axis through its center. The horizontal axis associated with lens standard 12 is shown at 48 in FIG. 2. In the case of this latter standard, this is accomplished by means of spaced-apart vertical support bars 50 extending up from mechanism 42 on opposite sides of the standard and associated adjustable rotation support mechanisms 52. The film standard 14 includes a similar arrangement of components.

Having described overall support assembly 28, it should be apparent that the two standards 12 and 14 can be adjusted horizontally relative to one another in which case the bellowed housing 16 accomodates such adjustments. At the same time, the standards can be pivotted about their respective horizontal and vertical axes in an attempt to make them parallel to one another. It is to be understood that this support assembly and all of the other components of view camera 10 thus far described are conventional and well-known in the art and therefore will not be described in further detail herein. Moreover, it is to be understood that view camera 10 includes other well-known components which have not been described at all since they are not pertinent to the present invention.

As indicated previously, the present invention resides in a technique for aligning (making parallel) the lens and film planes of view camera 10. For purposes of this alignment procedure, the lens plane is considered coinciding with the plane of the lens board facing the film standard and the film plane is the plane defined by the film within its film holder. In one embodiment of the present invention, the arrangement necessary to carry out this alignment procedure consists of a first mirror member 60 (see FIG. 4) and a second mirror member 62 (see FIG. 5), each of which will be described in detail immediately below.

Mirror member 60 which is generally rectangular in shape is conventional in construction and thus includes a mirror body including a mirrored surface 64. This mirror member is configured to fit within film standard 14 in lieu of the film holder so that the mirrored surface 64 faces lens standard 12. In this way, the mirror face coincides substantially with the film plane of the camera. In actuality, if mirror member 60 is of conventional construction, then the mirrored surface is located at the back end of the mirror body behind a layer of glass. Thus, under these circumstances, the mirrored surface may be disposed a small distance behind the actual film plane of the camera, for example ¼ inch which is the thickness of the glass. However, this discrepancy is negligible and can be ignored. Otherwise, it would be necessary to provide a more expensive mirror member in which a mirror surface is disposed on the very front face of the mirror body. For economical considerations, it is preferable to use a standard rear surface mirror, although the present invention contemplates both. In any event, in this particular embodiment, mirrored surface 64 is plain, that is, it includes no indicia thereon.

Referring specifically to FIG. 5, mirror member 62 is shown. This mirror member is similar to mirror member 60 to the extent that it also is preferably of conventional design including a mirror body having a rear mirrored surface 66. This mirror member which is supported on its own lensboard 67 (FIG. 4) is configured to temporarily replace the lens and its lensboard in lens standard 12 so that the mirrored surface 66 faces film standard 14 and mirrored surface 64 and coincides with the camera's lens plane. As illustrated in FIG. 5, mirror member 62 includes a hole 68 located centrally on mirrored surface 66 and extending entirely through the mirror body. This hole serves as part of overall indicia on the mirrored surface 66 which indicia also include an outer concentric ring 70. Note from FIG. 4 that the back side of through-hole 68 is located within the opening 72 which is provided in the lensboard 67 supporting mirror 62. In that way, the mirrored surface 64 can be viewed directly through view hole 68 from outside lens standard 12 and, thus, surface 66 and the indicia consisting of the view hole itself and ring 70 can be viewed indirectly by means of reflection from mirrored surface 64.

With two mirror members 60 and 62 positioned in the manner described immediately above, the lens and film planes of view camera 10 can be aligned in the following manner. First, the lens and film standards are placed in general (gross) parallel relationship with one another mechanically by the photographer using assembly 28 described above. However, it is not necessary to take actual edge-to-edge measurements of the two standards. Rather, once the two standards visually appear parallel, the photographer looks through view hole 68. Before doing this, camera housing 16 is preferably removed, as illustrated in FIGS. 4 and 5, if that is possible, which will be assumed for purposes of this embodiment. Thus, the photographer utilizes the ambient light to see mirrored surface 64 directly and mirrored surface 66 by means of reflection from surface 64. If the two mirrored surfaces are parallel (which means that the lens and film planes are parallel), then the indicia on mirrored surface 66, that is, hole 68 and ring 70, would take on only one known form of many different forms. Specifically, because of the back and forth reflections between the two mirrored surfaces, the hole 68 would appear in the center of a series of concentric circles 70A, 70B, 70C and so on, all of which actually result from the single ring 70 as illustrated in FIG. 6A. In other words, the hole would be located in the center of what appears to be a straight cylinder extending rearwardly because of the back and forth reflection between the mirrored surfaces. If, on the other hand, the mirrored surfaces are not parallel to one another, the reflection rings 70A, 70B, 70C and so on would not be concentric. Rather, as illustrated in FIG. 6B, they would then go off to one side relative to hole 68 so that the tube appears as if it is curving rearwardly as opposed to extending rearwardly in a straight direction. From the specific angle which the rings curve, the photographer can adjust the lens and film standards until the rings are concentric, thereby placing the two mirrored surfaces in parallel relationship.

From the description immediately above, it is important to note that by making the two mirrored surfaces parallel, the lens and film planes which correspond to these surfaces become parallel. This is the case whether or not the lens and film standards themselves are truly parallel. Once the mirrors are made parallel in this way, the camera is "zeroed" and the mirror members may be replaced with the lensboard and film holder, respectively.

The foregoing description has assumed that camera housing 16 is readily removable. If it is not, then, without available light within the housing chamber 18, it would be impossible to see the indicia on mirrored surface 66. Thus, in accordance with a second embodiment of the present invention, the overall alignment arrangement includes not only the two mirror members 60 and 62 but also means for providing a source of light within the camera chamber. One such means is a battery-operated device which is shown by means of dotted lines at 72 in FIG. 1. Device 72 is comprised of one or more batteries, suitable means for supporting the batteries and suitable means for connecting them to a light bulb, for example a flashlight bulb. The whole device is made sufficiently small to sit within the camera chamber 18 so as not to obstruct the view of hole 68 and ring 70, as illustrated in FIG. 1.

Another arrangement for providing light within camera chamber 18 is illustrated in FIG. 7. View camera 10 is shown there with a different set of mirror members 80 and 82. Mirror member 80 is identical to plane mirror member 60, with two exceptions. First, mirror member 80 is designed to fit within the lensboard in the lens standard 12 rather than the film standard 14 so that its mirrored surface faces the film standard. Second, mirror member 80 includes its own through-hole 84 centrally located so as to be accessible through lensboard opening 72. Mirror member 82 is designed to fit within film standard 14 and includes a mirrored surface 86 which faces mirror member 80 and which includes indicia consisting of a dot 88 and an outer concentric ring 90. In accordance with this embodiment of the invention, the dot and ring are formed from transparent or at least translucent portions of mirror member 82 so that ambient light may enter camera chamber 18 through ground-glass 22 (see FIG. 3) and these transparent or translucent portions. Otherwise, the two mirror members cooperate with one another to provide the previously described alignment procedures by viewing the indicia through view hole 84 even though the indicia is on the mirror member contained by the film standard rather than the lens standard.

The foregoing alignment techniques have assumed a particular indicia on either mirrored surface 66 (in the case of the first-described embodiment) or mirrored surface 86 (in the case of the last-described embodiment). In either case, the indicia set forth included a dot/hole and a circle. It is to be understood that any indicia can be utilized so long as it functions in the same manner as the indicia described, that is, it must provide a predetermined form when the mirrored surfaces are parallel and other different forms when they are not. For example, the rings 70 and 90 could be replaced with interrupted rings formed from dots and the like. Moreover, the present invention is not limited to this indicia on either specific mirrored surface. In fact, it is possible to provide part of the indicia on one mirrored surface and part on the other.

What is claimed is:

1. An alignment arrangement for use with a view camera assembly having a lens standard for containing a lensboard which carries the camera's lens and defines the camera's lens plane, a film standard in spaced-apart confronting relationship with said lens standard and configured to receive a film holder containing film, a camera housing connected with and extending between said lens and film standards, and means for supporting the lens standard, film standard and camera housing such that the standards can be adjustably moved with respect to one another to maintain a confronting, parallel relationship, said alignment arrangement comprising:

(a) a first mirror member having a mirror body including a mirrored surface, said first mirror member being configured to fit within said film standard in lieu of a film holder so that said mirrored surface faces said lens standard;

(b) a second mirror member having a mirror body including a mirrored surface and a view hole through said mirror body and mirrored surface, said second mirror member being adapted to replace temporarily said lens and its lensboard within said lens standard so that said second mirrored surface faces said film standard and first mirrored surface and so that the mirrored surfaces can be viewed through said view hole from outside said lens standard; and (c) indicia on at least one of said mirrored surfaces such that, when said mirrored surfaces are viewed through said view hole from outside said lens standard, said indicia will take only one of many different forms if the two mirrored surfaces are parallel, whereby the lens and film standards can be adjusted to provide said one form in another to insure that the lens plane of the camera is parallel with the camera film.

2. An arrangement according to claim 1 wherein said indicia includes a circle on one of said mirrors and a dot at the center of said circle.

3. An arrangement according to claim 2 wherein said circle is on said second mirrored surface disposed concentrically around said view hole which also serves as said dot.

4. An arrangement according to claim 2 wherein said circle and said dot are on said first mirror surface, wherein said film standard includes a ground glass, and wherein said circle and dot are defined by translucent or transparent portions of said first mirror member whereby, even if said camera housing remains assembled to the rest of said camera assembly, light from the ambient surroundings is able to enter the housing through the ground glass and the translucent or transparent portions of said first mirror member in order to make the indicia visible during adjustment of the standards.

5. An arrangement according to claim 1 including means located within said camera housing for illuminating the latter during the adjustment of said standards under those circumstances where the housing is not removed during said adjustment, whereby to make the indicia visible.

6. An arrangement according to claim 1 wherein said indicia is on said second mirrored surface disposed concentrically around said view hole which also serves as said dot.

7. An arrangement according to claim 1 wherein said indicia is on said first mirror surface, wherein said film standard includes a ground glass, and wherein said indicia are defined by translucent or transparent portions of said first mirror member whereby, even if said camera housing remains assembled to the rest of said camera assembly, light from the ambient surroundings is able to enter the housing through the ground glass and the translucent or transparent portions of said second mirror member in order to make the indicia visible during adjustment of the standards.

8. An arrangement according to claim 2 including means located within said camera housing for illuminating the latter during the adjustment of said standards under those circumstances where the housing is not removed during said adjustment, whereby to make the indicia visible.

9. In a view camera assembly having a lens standard for containing a lensboard which carries the camera's lens and defines the camera's lens plane, a film standard in spaced-apart confronting relationship with said lens standard and configured to receive a film holder containing film, a camera housing connected with and extending between said lens and film standards, and means for supporting the lens standard, film standard and camera housing such that the standards can be adjustably moved with respect to one another to maintain a confronting, parallel relationship, the improvement comprising an alignment arrangement forming part of the overall camera assembly, said alignment arrangement including:

(a) a first mirror member having a mirror body including a mirrored surface, said first mirror member being configured to fit within said film standard in lieu of a film holder so that said mirrored surface faces said lens standard;

(b) a second mirror member having a mirror body including a mirrored surface and a view hole through said mirror body and mirrored surface, said second mirror member being adapted to replace temporarily said lens and its lensboard within said lens standard so that said second mirrored surface faces said film standard and first mirrored surface and so that the mirrored surfaces can be viewed through said view hole from outside said lens standard; and (c) indicia on at least one of said mirrored surfaces such that, when said mirrored surfaces are viewed through said view hole from outside said lens standard, said indicia will take only one of many different forms if the two mirrored surfaces are parallel, whereby the lens and film standards can be adjusted to provide said one form in order to insure the lens plane of the camera is parallel with the camera film.

10. The improvement according to claim 9 wherein said indicia includes a circle on one of said mirrors and a dot at the center of said circle.

11. The improvement according to claim 10 wherein said circle is on said second mirrored surface disposed concentrically around said view hole which also serves as said dot.

12. The improvement according to claim 9 wherein said indicia is on said first surface, wherein said film standard includes a ground glass, and wherein said indicia is defined by translucent or transparent portions of said first mirror member whereby, even if said camera housing remains assembled to the rest of said camera assembly, light from the ambient surroundings is able to enter the housing through the ground glass and the translucent or transparent portions of said first mirror member in order to make the indicia visible during adjustment of the standards.

13. The improvement according to claim 9 including means located within said camera housing for illuminating the latter during the adjustment of said standards under those circumstances where the housing is not removed during said adjustment, whereby to make the indicia visible.

14. In a view camera assembly having a lens standard for containing a lensboard which carries the camera's lens and defines the camera's lens plane, a film standard in spaced-apart confronting relationship with said lens standard and configured to receive a film holder containing film, a camera housing connected with and extending between said lens and film standards, and means for supporting said lens standard, film standard and camera housing such that the standards can be adjustably moved with respect to one another to maintain a confronting, parallel relationship, a method of aligning the lens and film standards to insure the lens plane and film are parallel with one another, said method comprising the steps of:
 (a) providing a first mirror member having a mirror body including a mirrored surface and placing said first mirrored member within said film standard in lieu of a film holder so that said first mirrored surface faces said lens standard;
 (b) providing a second mirror member having a mirror body including a mirrored surface and a view hole through said mirror body and mirrored surface, said second mirror member being mounted on its own lensboard;
 (c) replacing said lens and associated lensboard with said second mirror member and its associated lensboard within said lens standard so that said second mirrored surface faces said film standard and first mirrored surface and so that the mirrored surfaces can be viewed through said view hole from outside said lens standard;
 (d) providing indicia on at least one of said mirrored surfaces such that, when said mirrored surfaces are viewed through said view hole from outside said lens standard, said indicia will take only one of many different forms if the two mirrored surfaces are parallel;
 (e) while viewing said mirrored surfaces through said view hole, adjusting said lens and/or film standards until said indicia provides said one form, whereby to insure that the lens plane of the camera is parallel with the film; and
 (f) thereafter removing said first and second mirror members from said film and lens standards, respectively, and placing a film holder and said lens and lensboard in the film and lens standards, respectively.

15. A method according to claim 14 wherein said indicia includes a circle on one of said mirrors and a dot at the center of said circle.

16. A method according to claim 15 wherein said circle is on said second mirrored surface disposed concentrically around said view hole which also serves as said dot.

17. A method according to claim 14 wherein said indicia is on said first mirror surface, wherein said film standard includes a ground glass, and wherein said indicia is defined by translucent or transparent portions of said first mirror member whereby, even if said camera housing remains assembled to the rest of the camera assembly, light from the ambient surroundings is able to enter the housing through the ground glass and the translucent or transparent portions of said second mirror member in order to make the indicia visible during adjustment of the standards.

18. A method according to claim 14 wherein said camera housing remains assembled during alignment of said film and lens standards, said method including the step of illuminating said housing during the adjustment procedure, whereby to make said indicia visible.

19. A method according to claim 14 including the step of removing said camera housing from the rest of the camera assembly before the film and lens standards are aligned.

* * * * *